Sept. 10, 1957     C. K. FREDERICKS     2,805,575
TEMPERATURE INDICATING DEVICE
Filed April 8, 1955                               2 Sheets-Sheet 1
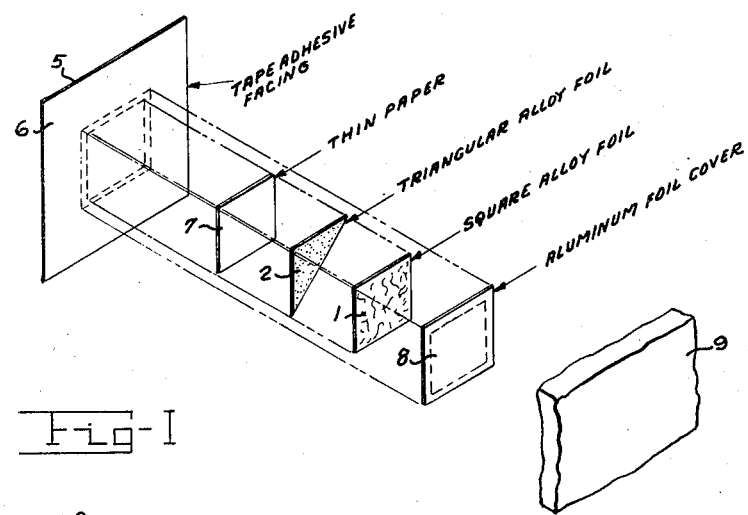
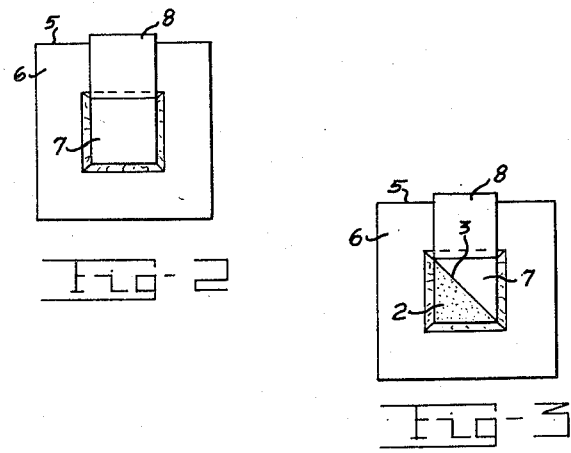
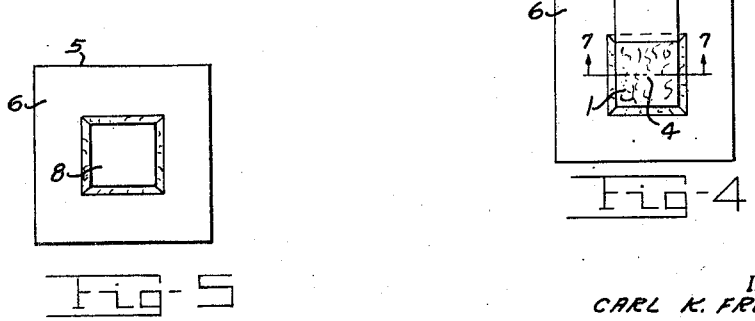
INVENTOR.
CARL K. FREDERICKS
BY
ATTORNEYS Sept. 10, 1957　　　C. K. FREDERICKS　　　2,805,575
TEMPERATURE INDICATING DEVICE
Filed April 8, 1955　　　　　　　　　　　2 Sheets-Sheet 2
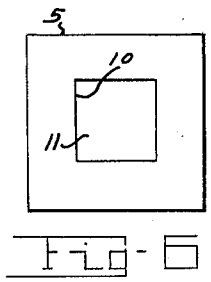
Fig-6
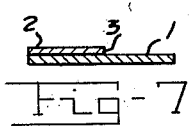
Fig-7
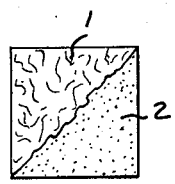
Fig-9
Fig-8
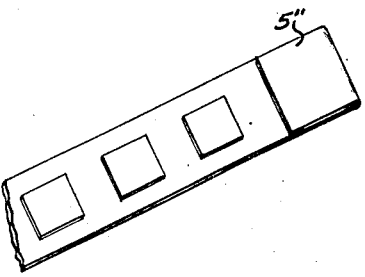
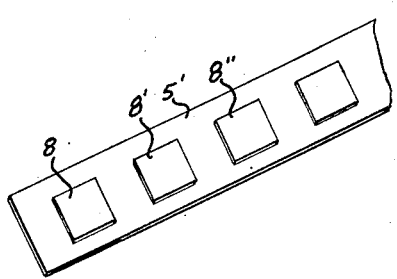
Fig-10
INVENTOR.
CARL K. FREDERICKS
BY
ATTORNEYS

United States Patent Office 2,805,575
Patented Sept. 10, 1957

2,805,575

TEMPERATURE INDICATING DEVICE

Carl K. Fredericks, La Mesa, Calif., assignor to the United States of America as represented by the Secretary of the Air Force Application April 8, 1955, Serial No. 500,316

8 Claims. (Cl. 73—358)

(Granted under Title 35, U. S. Code (1952), sec. 266)

The invention described herein may be manufactured and used by or for the United States Government for governmental purposes without payment to me of any royalty thereon.

This invention relates to temperature indicating devices and more particularly to a thermally responsive, diminutive, mechanical, optimum temperature recording device which is usable in difficultly accessible locations and which is sensitive to flash heat waves of short time duration.

In the past, temperature indicating devices such as thermocouples, thermometers, optical pyrometers, Seger cones and the like have been used widely. Within the past couple of decades temperature indicators which change in appearance, in physical state or otherwise, have been placed in limited use, supported commonly by an easily applied and removed adhesive patch or the like. The present invention is adapted for use with the latter type of indicator supports.

The present invention is an improved indicator which provides a permanent record of optimum attained temperature to which it is subjected even momentarily and preferably is of small mass for versatility of application and for increased sensitivity in time.

An object of the present invention is to provide an improved, registering temperature indicator which makes a permanent record of the optimum temperature to which it is exposed and which is well adapted for the patch type of support or the like.

Another object is to provide a small, inexpensive, sensitive, temperature registering device which, with a patch support, is easily applied and removed at difficultly accessible locations and which, after being exposed to heat, may be stored without change for extended periods of time under ordinary storage conditions without undergoing any change in its recorded temperature.

A further object is to provide an improved thermal indicator adapted to patch application and of low monetary value and high versatility.

A successfully operative embodiment of the present invention in a satisfactory mount is shown in the accompanying drawings wherein:

Fig. 1 is an exploded view of the temperature indicating device which is contemplated hereby adapted to a patch mount for being adhesively attached to a support for recording a maximum temperature to which the surface of the support may be exposed;

Fig. 2 is a plan view of the patch mount in Fig. 1 with a protective cover of aluminum foil laid back to show a thin paper backing adhering to the adhesive side of the device supporting tape;

Fig. 3 is Fig. 2 with a triangular alloy foil in place on the thin paper sticking to the tape;

Fig. 4 is Fig. 3 with a square alloy foil superimposed upon the triangular alloy foil;

Fig. 5 is Fig. 4 with a protective cover overlying the alloy foil triangle and square assembly;

Fig. 6 is Fig. 5 with the tape underlying the alloy assembly cut away and the thin paper replaced with protective foil;

Fig. 7 is a section of the improved indicator taken along the line 7—7 of Fig. 4 as assembled and prior to its use;

Fig. 8 is Fig. 7 after use;

Fig. 9 is a plan view of the improved indicator after use; and

Fig. 10 is a strip of a plurality of the improved indicators of graduated temperature characteristics along a single adhesive strip and with the strip terminating in a nonadhesive end tab to facilitate its removal from a support.

The improved indicator shown in the accompanying drawings comprises fundamentally a heat concentration base 1 represented in the accompanying drawing by a square, to which an associated member 2 becomes hinged along at least a part of an edge 3 by the action of sufficient heat to which the indicator has been exposed.

Fusion along the edge 3 appears to start at or near a substantially centrally located region of thermal energy concentration by metallic conduction or near a hot spot at the midpoint 4 of the base 1 and to progress away from the base midpoint 4 more or less along the edge 3, as the localized fluxing temperature characteristic of the two members 1 and 2 is arrived at. As to be expected also, the tips and the more exposed portions of the assembly tend to coalesce, to bead and to round off and the surfaces change in appearance somewhat when examined microscopically.

The member 2 illustratively may be, as shown, a right triangle which experimentally was 0.2 inch along each of its legs. The triangular member 2 may be positioned upon the square base 1 with the triangle legs aligned with two adjacent sides of the square base 1 which also may be 0.2 inch along each of its sides, as an illustratively experimental dimension which has been used satisfactorily. With this arrangement the triangle hypotenuse 3 extends diagonally across the square base 1 and crosses the heat concentrating base midpoint 4 thereof.

The sensitivity of the indicator to flash heat applications is materially enhanced by minimizing also the thickness of the indicator members 1 and 2. In working experimentally in the field of alloys and more particularly along the solidus-liquidus eutectic curves of alloys for sharpness of temperature responses, the following chart of alloys with their melting points as listed along the right hand column of the chart, have provided an illustrative plurality of temperature indications:

COMPOSITION OF EUTECTIC ALLOYS

| Bismuth | Lead | Tin | Cadmium | Indium | Other | Melting Point, ° F. |
|---|---|---|---|---|---|---|
| 44.70 | 22.60 | 8.30 | 5.30 | 19.10 | ------ | 117 |
| 49.00 | 18.00 | 12.00 | ------ | 21.00 | ------ | 136 |
| 50.00 | 26.70 | 13.30 | 10.00 | ------ | ------ | 158 |
| 57.00 | ------ | 17.00 | ------ | 26.00 | ------ | 174 |
| 51.60 | 40.20 | ------ | 8.20 | ------ | ------ | 197 |
| 54.00 | ------ | 26.00 | 20.00 | ------ | ------ | 217 |
| 55.77 | 40.38 | ------ | ------ | ------ | 3.85Ti | 237 |
| 55.50 | 44.50 | ------ | ------ | ------ | ------ | 255 |
| 57.42 | 1.00 | 41.58 | ------ | ------ | ------ | 275 |
| 60.00 | ------ | ------ | 40.00 | ------ | ------ | 291 |
| ------ | ------ | 67.75 | 32.25 | ------ | ------ | 351 |
| ------ | ------ | 91.00 | ------ | ------ | 9.00 Zn | 390 |
| ------ | ------ | 96.50 | ------ | ------ | 3.50Ag | 430 |
| ------ | ------ | ------ | ------ | 82.60 | 17.40Zn | 511 |
| ------ | 100.00 | ------ | ------ | ------ | ------ | 622 |

Successful experimental procedures directed toward imparting sensitivity to indicators made of the above designated eutectic compositions proved to be quite elusive. The above alloys were highly nonresponsive to usual metal working procedures of rolling, pressing and the like, because of the brittleness, the fragile lack of cohesion and related problems encountered in reducing the alloys to thin sections about a mil thick. The end result of the experimental work done provided continuous sections approaching a mil in thickness from which the above described base 1 and member 2 were satisfactorily made.

The method which was ultimately favored experimentally for making the base 1 and the member 2 comprises heating in an inert atmosphere preferably, spoon-like ladles of low heat capacity alloys such as those listed in the above chart slightly above their respective melting points shown in the right hand column of the chart and permitting the molten alloys to fall freely from experimentally upwardly of about 6 or 7 feet upon a plane surface, such as that of plate glass or the like. The temperature and the distance of fall of the molten alloys were graduated such that an alloy upon impact is caused to spread in a substantially uniform layer which was illustratively 2 or 3 inches in diameter and of a thickness in the low mils, such illustratively as 0.0015 inch and preferably about one mil in thickness. The resultant metal may be termed impacted metal on the ordinary dictionary definition of a single instantaneous stroke of a body in motion against a body at rest. The resultant thin sheet of metal may be termed metal foil. The resultant thin sections preferably are cut with a sharp blade to minimize rough irregular edge tears, rough irregular edges and the like, and exclusive of any holes, discontinuities in the smoothness of the resultant metal or the like. The straight, smooth cut edge 3 along the hypotenuse of the triangle 2 is indicated in Fig. 7. Upon being subjected to its fluxing temperature this same triangle edge 3 assumes an irregularly curved appearance when seen in plan view, as indicated in Fig. 9 upon the fluxing of the triangle hypotenuse 3 with the underlying part of the base 1, thereby hinging these two members together.

A preferred mount for the improved indicator comprises in Fig. 1 a tape 5 bearing a tacky adhesive 6 on one face thereof. The tackiness of the adhesive 6 is nullified over a limited area within a frame of a protective cover 8 of aluminum foil or the like, by thin cigarette paper 7 or comparable material. The alloy foil member 2 is positioned upon the paper 7 so that its hypotenuse extends between opposite corners thereof. The base 1 is then caused to overlay both the alloy foil member 2 and the paper 7, with all of their outer edges substantially in registration. When so assembled the hypotenuse edge 3 of the triangular alloy foil member 2 crosses a hot spot 4 or a heat concentration optimum central area of the base 1 to which, when sufficient heat is applied, fluxing between the member 1 and the base 2 is initiated.

The indicator members 1 and 2 preferably, although not necessarily, may be protected by the cover 8 which may be made of aluminum foil or the like. As attached to a support 9 by means of the adhesive 6 on the surface of the tape 5, the preferred order of the resultant assembly illustratively is the protective cover 8, the square alloy base 1, the triangular member 2, the paper 7 and then the tape 5, with the tape carried adhesive 6 exposed laterally outside of the frame provided by a portion of the cover 8 and exposed sufficiently so that the tape 5 will adhere to the support 9.

Where desired and as shown in Fig. 6, an aperture 10, such as the square shaped aperture shown illustratively, may be cut through the tape 5. In this modification a square of aluminum foil sufficiently larger than the aperture 10 may be firmly secured by the adhesive side of the tape 5 and may replace although larger than the paper 7 of the previously described elements of the described temperature indicator assembly comprising the triangular member 1, square 2 and preferably the protective overlying aluminum foil cover 8. This type of assembly on the apertured tape 5 in Fig. 6 is particularly applicable in recording a source of heat applied to the indicator from a source remote from the support 9.

The indicator that is contemplated hereby is sufficiently inexpensive and sufficiently simply made and assembled so that upon the failure of the adhesive 6 to accomplish its retention upon the support 9 under an applied temperature, the loss of the indicator assembly does not result in an appreciable financial loss. Furthermore, the sensitivity of the indicator is increased by the thinness of its section and its smallness, both of which minimize the mass of the indicator and permits its use on a support on very small areas and in locations where the use of thermocouples, thermometers and the like is undesirable or may be practically impossible.

In Fig. 10 of the accompanying drawings is shown an elongated tape 5' along which are successively positioned a plurality of indicators under protective covers 8, 8', etc. which indicators illustratively may correspond to the alloys which appear in the above chart and each of which indicators corresponds in structure, in assembly and in function with the illustratively square and triangular elements 1 and 2, respectively, which have been described herein. The tape 5' preferably terminates at one end in a finger grip portion 5" which is accomplished by overlapping the end of the tape with its adhesive surface in contact such that both opposite sides of the overlapping tape portion 5" are clean and free of the adhesive 6, thereby providing a conveniently gripped handle in accomplishing the removal of the tapes 5, 5' or the like.

Strips of the tape 5 or 5' may be handled and stored preparatory to its use by protectively covering its adhesive bearing face with a film plastic, waxed cloth or the like, in a manner such as that practiced in the handling of camelback rubber. The protective film may be stripped away from the tape adhesive 6 preparatory to applying the temperature indicating tape to a support 9.

The composition of the tape 5, preferably is heat resistant to the highest temperature to which it is to be subjected. The plurality of the temperature indicators along a tape preferably are arranged in progressively distinct steps of melting points or of similar temperature indicating phenomena. The use of eutectic alloys is preferred because of their relatively sharp and reproducible melting points.

The temperature indicator which is described herein is applicable for both temporary and for steady state temperature indications. It may be installed at any convenient time prior to the temperature rise under investigation. After its exposure to heat and after it has been caused to return to ambient temperature it may be removed from its support 9, disassembled, inspected for temperature indications and otherwise examined. It will be found that the paired members of alloys will have experienced progressive degrees of fluxing as their respective melting points have been reached and passed until the increasing temperature has failed to cause the fluxing of one pair of alloys which thereby indicates the optimum temperature to which that particular tape has been exposed. The data resulting from the experimentation accomplished may be recorded at any convenient time after the tape is removed from its support. The temperature tape illustratively may be adhered to sheet metal on the side to which irradiation is applied.

When used for measuring steady state temperatures a single calibration is preferred by determining in advance the fusion temperatures of each pair of elements on a particular tape which is to be exposed to experimental heat phenomena. In measuring transient temperatures of short time duration the calibration of the pairs of elements carried by each particular tape preferably is made at comparable or matching irradiation transient temperatures and for equally brief time durations. The accuracy of the temperature indicator contemplated hereby, when so calibrated, may properly be assumed to be within variations of plus or minus 5° F.

The temperature indicator described herein is applied to its support 9 with a minimum of effort and time. It is entirely automatic in its operation in that it does not require the services of an observer or other attendant and its installation and removal at remote and in difficultly accessible locations is accomplished quickly and conveniently.

The temperature indicator contemplated hereby requires no instrumentation installation nor observation and it requires no power or other energy supply for its successful operation and for the making of determinations therewith. The present temperature indicator minimizes weight, space and expense factors and does not require the services of specialized personnel for converting its findings into confirmable data.

It has been found experimentally also that functionally the protective foil 9 may be eliminated if not needed for support and particularly where the base 1 and the member 2 are of very small dimensions, in which event it may be advisable to employ microscopic examination of the plurality of indicator components borne by a particular tape in establishing the temperature to which the tape has been exposed.

It is to be understood that limited modifications in the contour and in the materials of the indicator components may be made without departing from the scope of the present invention.

What I claim is:

1. A temperature indicating device, comprising a first member of impacted metal foil developing a substantially centrally located region of thermal energy concentration by metallic conduction therein when exposed to thermal energy, and a second foil member of like material having an edge positioned sufficiently near the region of thermal energy concentration of said first member to accomplish sufficient fusion therebetween to adhere the two members together.

2. The device defined in claim 1 where the thickness of the members is at least in low mils.

3. The device defined in claim 1 where the members are of metal alloy composition.

4. The device defined in claim 1 where the members are metal alloys of substantially eutectic proportions.

5. The device defined in claim 1, where the first member is a square base, and the second member has an edge which extends across the center portion of the square base first member.

6. A temperature indicating device comprising a metal base about one mil thick, and a metal member about one mil thick having an edge extending across the central portion of and contacting the metal base, and wherein both the base and the member are made of mechanically impacted substantially brittle metal such that at least a part of the member edge fuses with the base at a previously determined temperature.

7. A temperature indicating device comprising a pair of brittle and impacted metal foils each about one mil thick with about midway of one edge of one foil mechanically contacting the center of the other foil of the pair, and a mount for the pair of metal foils comprising a tape bearing a tacky adhesive on one tape face, a thin paper adhered to the tape adhesive face on one side of the paper and the other side of the paper contacting the foil having the edge, and a cover overlying the foil member remote from the tape.

8. A temperature indicating device comprising a first member of impacted metal foil developing a substantially centrally located region of thermal energy concentration by metallic conduction therein when exposed to thermal energy, and a second foil member having an edge positioned sufficiently near the region of thermal energy concentration of said first member to accomplish sufficient fusion therebetween to adhere the two members together and wherein the two foil members have alloy eutectic compositions falling substantially on the solidus-liquidus line thereof and the alloy is selected from the group consisting of bismuth, cadmium, indium, lead, silver, tin, titanium and zinc.

References Cited in the file of this patent

UNITED STATES PATENTS

| | | |
|---|---|---|
| 1,668,090 | Spencer | May 1, 1928 |
| 2,028,507 | Henderson et al. | Jan. 21, 1936 |
| 2,171,599 | Reid | Sept. 5, 1939 |
| 2,359,794 | Rogers | Oct. 10, 1944 |
| 2,490,933 | Tornquist | Dec. 13, 1949 |
| 2,548,897 | Kroll | Apr. 17, 1951 |

FOREIGN PATENTS

| | | |
|---|---|---|
| 686,622 | France | July 29, 1930 |